Figure 4:
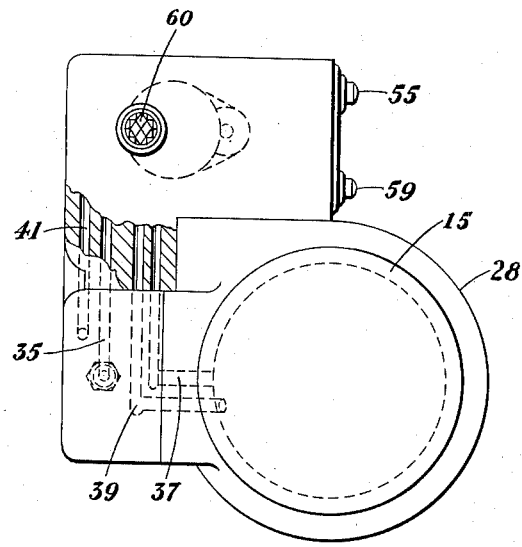

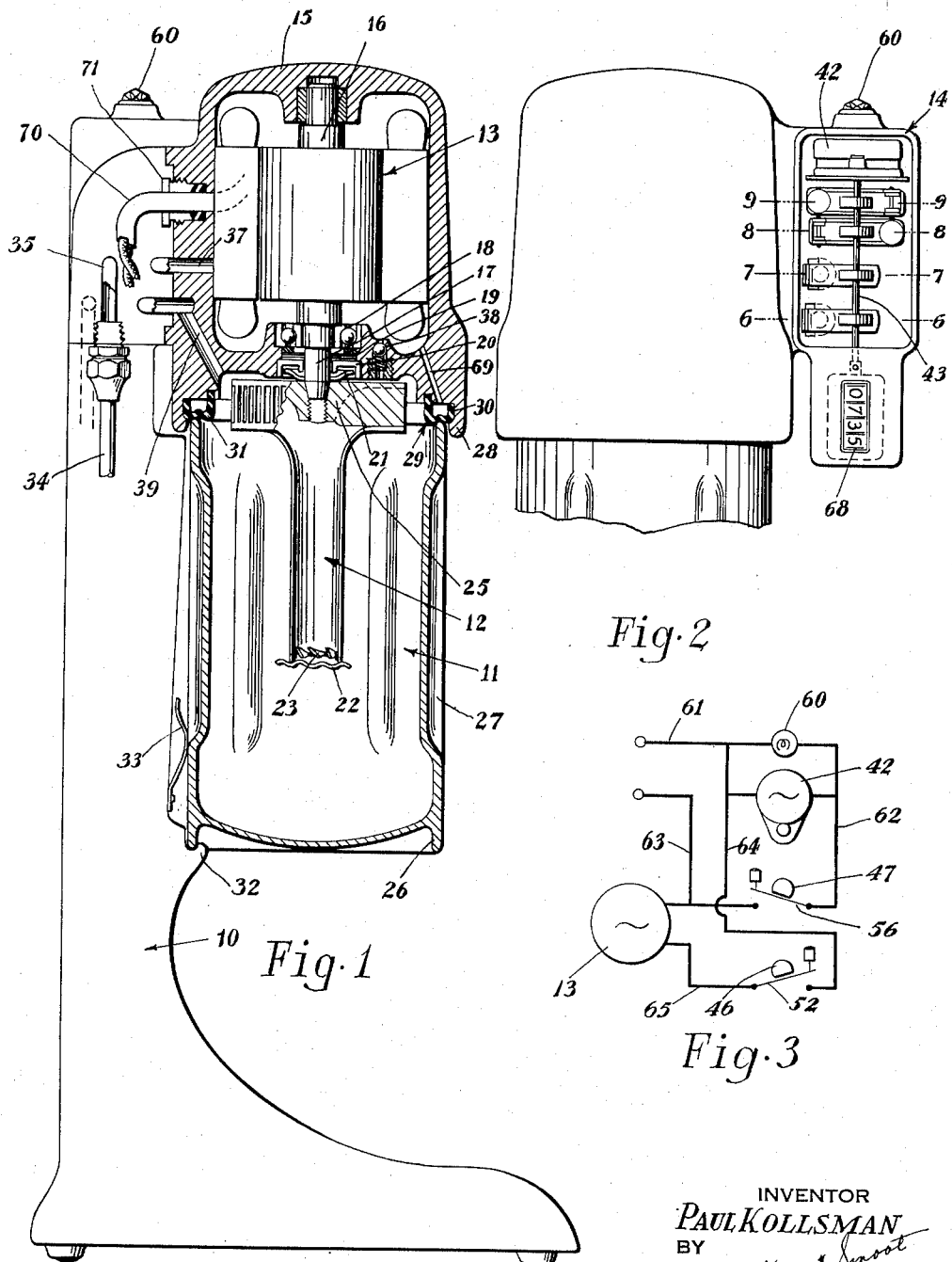

April 1, 1952 P. KOLLSMAN 2,591,440
CARBONATING APPARATUS
Filed Dec. 8, 1945 2 SHEETS—SHEET 2

INVENTOR
PAUL KOLLSMAN
BY
Duell, Kane & Smoot
ATTORNEY

Patented Apr. 1, 1952

2,591,440

UNITED STATES PATENT OFFICE 2,591,440

CARBONATING APPARATUS

Paul Kollsman, New York, N. Y.

Application December 8, 1945, Serial No. 633,883

7 Claims. (Cl. 261—93)

1

This invention relates to an improved carbonating apparatus to be used for carbonating beverages and other liquids.

At the present time it is common practice to carbonate liquids such as beverages sometime prior to their use or consumption and then either to store them in bottles or other sealed containers or in a central storage tank for subsequent use or consumption. The present practice involves certain recognized disadvantages. Thus, where the carbonated beverage is packed in bottles or similar containers a relatively large stock of beverages of various flavors must be stored which involves a considerable investment and also requires a great deal of space. Where carbonated water is prepared on the premises and is stored in a central pressure tank to be mixed at the dispensing fountain with various other ingredients to produce beverages of different types, considerable equipment is required including compressor units, storage facilities, electrical equipment to operate the compressor units and additional piping and plumbing to conduct the carbonated water from the storage unit to the dispensing point. This also requires considerable investment and occupies a great deal of space. It will also be appreciated that the storage facilities and piping increases the sanitation and maintenance problem.

It is an object of the present invention to overcome the disadvantages heretofore encountered and to provide an improved carbonating apparatus whereby the desired quantity of beverage can be prepared and carbonated at the dispensing point, for instance a soda fountain counter, at the time that it is to be consumed thereby eliminating the necessity for storing large quantities of bottled beverages or the necessity of having costly storage and carbonating facilities for preparing and storing carbonated water prior to usage.

A further object is the provision of improved carbonating apparatus whereby the beverage may be prepared and carbonated in an individual cup or container which may be used as a drinking cup or from which the beverage may be transferred to another receptacle.

Another object is the provision of improved carbonating apparatus whereby a beverage may be simultaneously carbonated, iced and prepared and mixed with flavoring extracts, syrups, sugar and other ingredients.

A further object is the provision of an improved carbonating apparatus whereby a liquid can be carbonated in a minimum amount of time and with the maximum amount of efficiency.

2

Still another object is the provision of improved apparatus of the above character having a removable receptacle for the liquid which is to be carbonated in which safety mechanism is provided whereby the apparatus cannot be put into operation to build up pressure in the receptacle unless the receptacle is firmly and securely in position in the receptacle.

Among other objects is the provision of apparatus of the above character having an improved sealing device for sealing the receptacle to the apparatus and also, improved timing mechanism and manually controlled means for initiating and controlling the operation of the apparatus.

Figure 6:
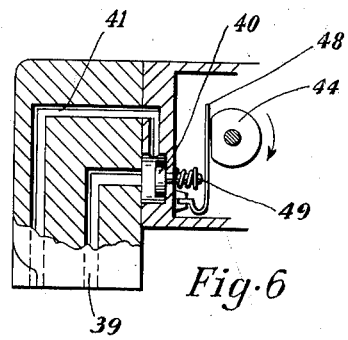
Figure 7:
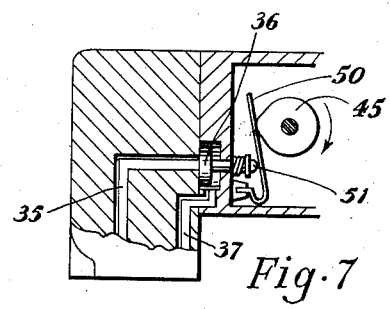
Figure 5:
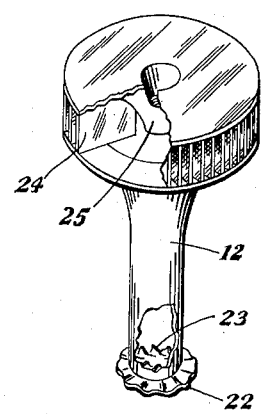
Figure 8:
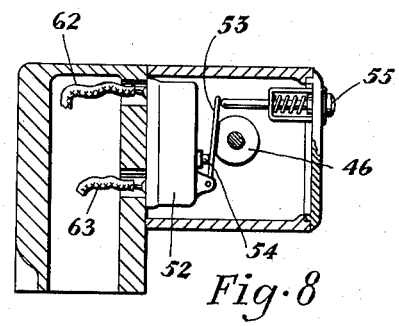
Figure 9:
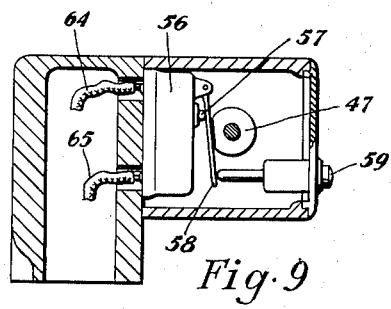

Other objects will be apparent from the following detailed description of the drawings in which:

Fig. 1 is a side elevational view of carbonating apparatus embodying my invention with portions thereof shown in section, Fig. 2 is a rear view of the upper portion of the mechanism showing the motor housing with portions broken away to reveal the interior of the timing mechanism, Fig. 3 is a diagram showing the electrical circuits for the primary motor and also for the timing motor, Fig. 4 is a top plan view of the apparatus with portions broken away to reveal the ducts or passageways for the carbon dioxide, Fig. 5 is a perspective view of the stirring and agitating device with portions broken away to reveal the construction thereof, Fig. 6 is a sectional view on the lines 6—6 of Fig. 2 showing the pressure release valve and timing cam for controlling its operation, Fig. 7 is a sectional view on the lines 7—7 of Fig. 2 showing the carbon dioxide supply valve and the timing cam for controlling its operation, Fig. 8 is a sectional view on the lines 8—8 of Fig. 2 showing the switch for the circuit of the motor which drives the stirring and agitating device together with its timing cam and manually operated push button and, Fig. 9 is a sectional view on the lines 9—9 of Fig. 2 showing the switch for the circuit of the timing motor together with its timing cam and manually operated push button.

My improved carbonating apparatus comprises generally a support or stand 10, a removable receptacle in the form of cup 11 in which the beverage is prepared and carbonated, a mixing and agitating device 12 driven by an electric motor 13, valves for introducing carbon dioxide under pressure into the receptacle and also for releasing the pressure in the receptacle, and a timing unit indicated generally at 14 for controlling the cycle of operation of the device.

The support or stand consists of a base with an upright portion having attached to the upper end thereof a housing 15 which encases the motor 13 and the timing unit 14 and which is substantially gas-tight so that carbon dioxide may be introduced into the receptacle through the interior of the housing. This arrangement simplifies the problem of maintaining suitable pressure in the receptacle while the liquid is being carbonated. The motor is suitably supported in the housing and suitable bearings are provided for the armature.

At its lower end the armature 16 is provided with an extension 17 which is connected to the upper end of the mixing and agitating device 12. To prevent leakage of the lubricant from the ball bearing 18, suitable packing 19, held in place by the flanged cap 20 may be provided. A concavo-convex disk 21 is preferably provided beneath the cap with the concave surface facing upwardly in the manner shown to serve as an additional safeguard against leakage of the lubricant.

The mixing and agitating device 12 consists of a relatively elongated tubular rotor having a scalloped or rippled flange 22 at its lower end to aid in mixing and agitating the liquid and with a central opening communicating with the interior of the rotor having angularly disposed vanes 23 extending inwardly therefrom which serve as impellers to force the liquid upwardly in the interior of the rotor when the mixing and agitating device is rotated. At its upper end the rotor flares outwardly and is provided with a plurality of relative closely spaced radially disposed blades 24 which provide a plurality of radial passageways open at their outer ends and communicating at their inner ends with the interior of the rotor. Liquid which is forced upwardly through the interior of the rotor when the device is rotated is thus impelled outwardly along the blades by centrifugal force at a progressively accelerated rate of speed with the result that the liquid is formed into a progressively thinner sheet or film and flies outwardly from the ends of the blades in the form of a finely divided spray. This formation of the liquid into a thin film and separation of the film into fine particles increases the surface contact between the liquid and the carbon dioxide and thereby accelerates the carbonating action. At its upper end the rotor is provided with a centrally positioned core 25 which is centrally tapped as shown for attachment to the lower end of the armature extension 17.

Receptacle 11 is preferably in the form of a cup open at its upper end and provided with a depending flange 26 at its lower end and also may have suitable ribs or flutes 27 in its sides to stop or minimize rotation of the liquid and also to facilitate gripping in the hand. The receptacle may serve as the drinking cup in which the beverage to be carbonated is consumed in which event the receptacle is of suitable size to contain one serving of the beverage. If preferred, the receptacle may merely be used for the purpose of carbonating and preparing the beverage in which event it may be large enough to hold either one or a plurality of servings.

To insure adequate sealing between the housing and the receptacle so that pressure may be built up within the receptacle during the carbonating operation the housing 15 is provided with a downwardly depending hood 28 slightly larger in diameter than the external diameter of the receptacle and immediately inside the hood I provide a sealing device 29 which is generally U-shaped in cross-section with the closed side facing downwardly and adapted to engage the upper edge of the receptacle when it has been applied to the apparatus as shown most clearly in Fig. 1. The sealing device is held in place in a novel manner, the one side thereof indicated at 30 being tightly engaged beneath an overhanging edge of the hood 28 and the other side 31 being slightly longer and projecting into a circular slot provided in the under surface of the motor housing.

The receptacle is applied to the apparatus by engaging the upper edge thereof against the sealing device and simultaneously pressing it upward and shifting the lower end inwardly until the flange 26 at the lower end of the cup is engaged by the detent or keeper 32 projecting outwardly from the front surface of the stand. When the receptacle has been applied to the apparatus in this fashion carbon dioxide under pressure can be safely introduced into the interior thereof and the receptacle will be firmly held in position due to the detent engaging the flange at the lower end of the cup and the seal and hood at the upper end of the cup.

Due to the fact that considerable pressure is built up in the interior of the receptacle and damage and injury might be caused if the receptacle were not firmly held in position, I provide suitable safety mechanism to prevent the operation of the device to build up pressure in the receptacle unless it is properly placed in position. This safety mechanism may take the form of a spring 33 secured to the forward wall of the stand immediately above the detent or keeper 32 and projecting outwardly sufficiently to engage the side of the receptacle 11 and exert sufficient force against it to unseat it unless the receptacle has been properly placed in position with the upper end inside the hood in engagement with the seal and the lower end in engagement with the keeper or detent 32.

Carbon dioxide under pressure may be supplied to the apparatus from a suitable source of supply through the tube 34 which connects with the duct or passageway 35 formed in the stand which in turn communicates with a valve chamber having a suitable valve 36 therein. The valve chamber also connects with a duct or passageway 37 which in turn leads to the interior of the motor housing. The interior of the housing in turn communicates with the interior of the receptacle through a suitable duct or passageway controlled by a spring-pressed ball check valve 38. It will thus be seen that carbon dioxide under pressure can be introduced into the receptacle through tube 34, passage 35 and passageway 37 when valve 36 is open and thence into the interior of the housing 15 from which it may pass by valve 38 into the receptacle. Pressure between the interior of the housing and receptacle and the interior of seal 29 is preferably substantially equalized by means of passage or duct 69.

Pressure inside the receptacle may be released through duct or passageway 39 formed in the housing and communicating at one end with the interior of the receptacle and at the other end with a valve chamber having valve 40 positioned therein. The valve chamber also connects with duct or passageway 41 which in turn may exhaust to the atmosphere.

The operation of the motor and of the valves in the desired sequence is controlled by timing mechanism 14 which consists of an induction motor 42 driving a cam shaft 43 having cams 44, 45, 46 and 47 mounted thereon so as to rotate therewith and connected at its lower end with counting and recording mechanism 68 which registers and indicates numerically each cycle of operation of the device.

It will be seen that cam 44 controls the operation of the exhaust valve 40 through engagement with spring keeper 48 which in turn engages with the end of the spring pressed valve stem 49. The spring on the valve stem normally holds the valve in open position and is only closed through the operation of the cam 44.

Cam 45 controls the operation of valve 36 through spring keeper 50 which is engageable with the end of the spring pressed valve stem 51. The spring serves to urge the valve to open position and the action of cam 45 serves to close the valve.

Cam 46 serves to control the operation of switch 52 which in turn controls electric motor 13. Thus, cam 46 is engageable with follower 53 which in turn is engageable with push button 54. The switch is normally in open position and it is closed through the action of cam 46 causing the depression of push button 54. Switch 52 may also be manually operated by means of spring pressed push button 55 which is mounted on the exterior of housing 15 and projects inwardly so that its end engages the cam follower 53. By pressing button 55 follower 53 is shifted inwardly to depress the push button 54 and close the switch.

Cam 47 controls the operation of switch 56 which in turn controls the operation of the timing motor 42. Switch 56 is similar to switch 52 and is provided with a push button 57 operated by cam follower 58 which is engageable either by the cam or by the end of the manually operated push button 59.

A suitable pilot light 60 may be provided on the exterior of the housing 15 to indicate when the device is in operation.

The electrical circuit for the apparatus is indicated in Fig. 3. Thus, one side of the source of electric power is connected by lead 61 to timing motor 42 and also to pilot light 60 which is in parallel with the motor. The other side of the circuit of the timing motor and pilot light are connected by lead 62 to switch 56 which in turn is connected by lead 63 to the other side of the source of electric power. Lead 61 is also connected by lead 64 to switch 52 which in turn is connected by lead 65 to motor 13 the other side of motor 13 is connected by lead 63 to the other side of the source of electric power. The electric power line may be encased in a cord or cable 70 which at the point of introduction into the housing is provided with a seal and packing 71 to prevent pressure leakage.

In using my apparatus and carrying out my method the beverage or other liquid to be carbonated is placed in the receptacle 11. In this connection the beverage may be a prepared beverage which only requires to be carbonated or it may consist of a mixture of water, milk or some other liquid, flavoring ingredients, syrups, ice, etc. The receptacle is then applied to the apparatus in the manner previously described by placing the upper edge against the seal, pressing it upwardly and shifting the lower end inwardly into engagement with the keeper or detent 32. If the receptacle has not been properly applied to the apparatus the safety device or spring 33 will press it outwardly thereby preventing the operation of the device to build up pressure in the receptacle. When the receptacle has been properly applied the cycle of operation is initiated by pressing push button 59 which completes the circuit of timing motor 42 thereby causing the cam shaft and timing cams to operate.

Figs. 6 to 9 indicate the relative position of the cams when the device is in a position of rest prior to initiating the cycle of operation. Thus, it will be seen that exhaust valve 40 is open so that no pressure can be built up inside of the receptacle. Valve 36 is closed preventing carbon dioxide from flowing into the interior of the housing and receptacle. Switches 52 and 56 are open preventing the operation of the motor. When the timing motor starts operating, cam 47 rotates sufficiently to hold switch 56 closed for the duration of the timing cycle. Also, simultaneously therewith cam 46 closes switch 52 causing motor 13 to operate which in turn causes mixing and agitating device 12 to rotate. At the same time, cam 44 causes exhaust valve 40 to close and cam 45 causes valve 36 to open with the result that carbon dioxide under pressure flows into the interior of housing 15 and thence into receptacle 11.

The rotation of the mixing and agitating device accelerates the carbonation of the beverage in the first place by stirring and agitating the beverage to such an extent as to mix bubbles of carbon dioxide therewith and in the second place by forcing the liquid upwardly through the interior of the rotor and then spreading it out in a fine film on the blades 24 and impelling it outwardly in a fine spray. The blades 24 are located above the level of the liquid and the film and spray are formed in the carbon dioxide atmosphere. In this manner a large surface area of the liquid is in contact with the carbon dioxide both in and adjacent the rotor. In other words the liquid is not only mixed and agitated in the presence of the carbon dioxide but is also broken up into a thin film and fine particles which are brought into contact with the carbon dioxide. In the case of beverages which have to be mixed with syrups and other ingredients the mixing and agitating device mixes and prepares the beverages at the same time that it carbonates it.

Valve 36 remains open to apply carbon dioxide under pressure and motor 13 keeps operating a sufficient period of time to cause mixing of the beverage and the desired carbonation thereof. Thereafter, cam 46 is so arranged as to cause switch 52 to open thereby stopping the operation of motor 13 and of the mixing and agitating device 12 while the liquid remains under pressure. When the agitation of the liquid has stopped and it becomes quiet the next operation is for cam 45 to cause valve 36 to close thereby shutting off the supply of carbon dioxide and simultaneously cam 44 causes exhaust valve 40 to open thereby releasing the pressure in the receptacle. At this point the cycle of operation has been completed and cam 47 also causes switch 56 to open thereby stopping the operation of timing motor 42.

By discontinuing the operation of the stirring and agitating device while the liquid is still under pressure and maintaining the pressure until the liquid becomes quiet a maximum degree of carbonation is maintained.

Upon the completion of the cycle, the dispensing receptacle may be withdrawn from the apparatus and the beverage may be dispensed either by consuming it in the receptacle or by transferring it to another container for consumption. It will be appreciated that my apparatus does not require the use of pre-cooled beverages or liquids and that the liquid may be chilled in the course of the operation of my device by putting ice or ice cream in the receptacle along with the beverage. The apparatus may be set up at the counter of a store or at a soda fountain and may be used for carbonating drinks or for carbonating and mixing drinks by operating it in the manner previously described. It may also be used simply for mixing drinks without carbonating them by operating the manually controlled push button 55 which controls the circuit of motor 13. My apparatus eliminates the necessity of maintaining large stocks of bottled beverages of various flavors. It also eliminates the necessity of providing and maintaining a central storage chamber for carbonated water together with the necessary equipment and piping in connection therewith and the attendant maintenance and sanitation problems.

It will thus be appreciated that I have provided a relatively simple apparatus for carbonating a beverage in an efficient manner at substantially the time it is to be consumed.

It will be appreciated that the carbonating chamber may be wholly within the receptacle 11, partly within the receptacle and partly within the support as shown, or wholly within the support.

It should also be understood that modifications may be made in the illustrated and described embodiment of my invention without departing from the invention as set forth in the accompanying claims.

I claim:

1. An apparatus for preparing a highly carbonated beverage ready for consumption in a highly carbonated state comprising, a stationary support including a fixed head having an undersurface and a passage through said head leading to said undersurface, said passage being connectible to a source of carbon dioxide under pressure, the head being devoid of a liquid passage therethrough; a dispensing vessel adapted to hold a charge of liquid to be carbonated, said vessel being pressure tightly attachable to, and removable from, the undersurface of said head and forming a pressure tight stationary chamber with said head for confining the charge of liquid in said chamber; valve means in said support in the carbon dioxide passage for admitting carbon dioxide into said chamber; power driven means in said head and extending below said undersurface into said vessel for mechanically agitating in said vessel the liquid contents of said vessel while under pressure; and means for relieving pressure from said chamber to permit removal of said vessel from said head for dispensing of said charge at atmospheric pressure in a substantially quiescent state.

2. An apparatus for preparing a highly carbonated beverage ready for consumption in a highly carbonated state comprising, a stationary support including a fixed head having an undersurface and a passage through said head leading to said undersurface, said passage being connectible to a source of carbon dioxide under pressure, said head being devoid of a liquid passage therethrough; a dispensing vessel adapted to hold a charge of liquid to be carbonated, said vessel being pressure tightly attachable to, and removable from, the undersurface of said head and forming a pressure tight stationary chamber with said head for confining therein the charge of liquid; valve means in said support in the carbon dioxide passage for admitting carbon dioxide into said chamber; power driven means in said support for mechanically agitating in said vessel the liquid contents of said vessel while under pressure, said agitating means extending below said undersurface into said vessel; and an exhaust valve in said head for relieving pressure from said chamber to permit removal of said vessel from said support for dispensing of said charge from said vessel at atmospheric pressure in a substantially quiescent state.

3. An apparatus for preparing a highly carbonated beverage ready for consumption in a highly carbonated state comprising, a stationary support including a fixed head having an undersurface and a passage through said head leading to said undersurface, said passage being connectible to a source of carbon dioxide under pressure, said head being devoid of a liquid passage therethrough; a dispensing vessel adapted to hold a charge of liquid to be carbonated, said vessel being pressure tightly attachable to, and removable from, the undersurface of said head and forming a pressure tight stationary chamber with said head for confining therein the charge of liquid; valve means in said support in the carbon dioxide passage for admitting carbon dioxide into said chamber; power driven means in said head and extending below said undersurface into said vessel for mechanically agitating in said vessel the liquid contents of said vessel while under pressure; an exhaust valve in said support for relieving pressure from said chamber; and time controlled means for operating said valve means, said mechanical agitating means, and said exhaust valve in timed relationship.

4. An apparatus for preparing a highly carbonated beverage ready for consumption in a highly carbonated state comprising, a cover member having a passage therethrough connectible to a source of carbon dioxide under pressure said member having an undersurface to which said carbon dioxide passage leads, said member being devoid of a liquid passage therethrough; a dispensing cup adapted to hold a charge of liquid to be carbonated, said cup being pressure tightly attachable to, and removable from, said undersurface of said cover member and forming a pressure tight chamber with said cover member for confining the charge of liquid in said chamber; valve means in said carbon dioxide passage for admitting carbon dioxide into said chamber; a motor in said cover means; liquid dispersing means operable by said motor and extending below said undersurface into said cup for dispersing liquid from said charge in a divided state into the carbon dioxide atmosphere in said chamber while under pressure; and pressure relief means in said member for relieving pressure from said chamber to permit removal of said cup from said cover member for dispensing of said charge at atmospheric pressure in a substantially quiescent state.

5. An apparatus for preparing a highly carbonated beverage ready for consumption in a highly carbonated state comprising, a stationary support including a fixed head having an undersurface and a passage through said head leading to said undersurface, said passage being connectible to a source of carbon dioxide under pressure; a dispensing cup adapted to hold a charge of liquid to be carbonated, said cup having a bottom adapted to rest on a supporting surface of said support and having a rim; sealing means on said undersurface of said head adapted to seat against said rim and form a pressure tight seal between said support and said cup thus forming a pressure tight stationary chamber of said cup and support confining therein said charge of liquid; valve means in said support for controlling admission of carbon dioxide through said passage; a motor in said support; liquid dispensing means in said head extending below said undersurface into said vessel, said dispensing means being operable by said motor for dispersing liquid from said charge in a divided state into the carbon dioxide atmosphere in said chamber while under pressure; and a relief valve in said head for relieving pressure from said chamber to permit removal of said cup from said head for dispensing of said charge at atmospheric pressure in a substantially quiescent state.

6. An apparatus for preparing a highly carbonated beverage ready for consumption in a highly carbonated state comprising, a support having a passage therethrough connectible to a source of carbon dioxide under pressure; a dispensing cup adapted to hold a charge of liquid to be carbonated, said cup having a bottom adapted to rest on a supporting surface of said support and having a rim; sealing means in said support adapted to seat against said rim and form a pressure tight seal between said support and said cup thus forming a pressure tight chamber of said cup and support confining therein said charge of liquid; valve means in said support for controlling admission of carbon dioxide through said passage; a motor in said support; means operable by said motor for dispersing liquid from said charge in a divided state into the carbon dioxide atmosphere in said chamber while under pressure; a relief valve in said support for relieving pressure from said chamber to permit removal of said cup from said support for dispensing of said charge at atmospheric pressure in a substantially quiescent state; and joint control means for interdependently operating said valve means, said motor and said relief valve.

7. An apparatus for preparing a highly carbonated beverage ready for consumption in a highly carbonated state comprising, a support having a passage therethrough connectible to a source of carbon dioxide under pressure; a dispensing cup adapted to hold a charge of liquid to be carbonated, said cup having a bottom adapted to rest on a supporting surface of said support and having a rim; a pressure operable gasket in said support adapted to seat against said rim upon an increase in pressure inside the chamber formed by said cup and support with respect to the surrounding atmosphere; valve means in said support for controlling admission of carbon dioxide through said passage; a motor in said support; means operable by said motor for dispersing liquid from said charge in a divided state into the carbon dioxide atmosphere in said chamber while under pressure; a relief valve in said support for relieving pressure from said chamber to permit removal of said cup from said support for dispensing of said charge at atmospheric pressure in a substantially quiescent state; and time controlled means for operating said valve means, motor and relief valve in a predetermined cycle.

PAUL KOLLSMAN.

REFERENCES CITED

The following references are of record in the file of this patent:

UNITED STATES PATENTS

| Number | Name | Date |
|---|---|---|
| 1,336,720 | Baulig | Apr. 13, 1920 |
| 1,591,971 | Garrett | July 13, 1926 |
| 1,705,162 | Wahl | Mar. 12, 1929 |
| 1,749,625 | Becker | Mar. 4, 1930 |
| 1,905,986 | Jacobs et al. | Apr. 25, 1933 |
| 2,022,415 | Felderman | Nov. 26, 1935 |
| 2,391,003 | Bowman | Dec. 18, 1945 |

FOREIGN PATENTS

| Number | Country | Date |
|---|---|---|
| 19,522 | Great Britain | Nov. 11, 1891 |
| 18,435 | Great Britain | Aug. 26, 1903 |
| 149 | Great Britain | Jan. 3, 1914 |
| 233,743 | Great Britain | May 18, 1925 |
| 464,237 | Great Britain | Apr. 14, 1937 |
| 483,958 | Great Britain | Apr. 28, 1938 |